United States Patent
Spivak

[15] 3,662,328
[45] May 9, 1972

[54] APPARATUS FOR DETERMINING THE PROXIMITY OF MOVING VEHICLES

[72] Inventor: David Spivak, One Washington Square Village, New York, N.Y. 10012

[22] Filed: Apr. 30, 1969

[21] Appl. No.: 820,386

[52] U.S. Cl. ............................................................. 340/33
[51] Int. Cl. ........................................................ G08g 1/00
[58] Field of Search ........................... 340/33, 263, 52 R, 53

[56] References Cited

UNITED STATES PATENTS

| 2,628,345 | 2/1953 | Tod ........................................ 340/54 |
| 3,442,347 | 5/1969 | Hodgson et al. ...................... 340/53 X |

*Primary Examiner*—William C. Cooper
*Attorney*—Auslander and Thomas

[57] ABSTRACT

The present invention provides means adaptable for use on vehicles to determine the proximity between vehicles. The apparatus generally provides means for transmitting a signal and means for receiving a signal on a vehicle with the transmitted signal preferably ultrasonic and proportional to the speed of the transmitting vehicle. The emission member is mounted on the transmitting vehicle in a manner so as to automatically selectively orient itself so that the transmitted signal follows the path of the vehicle under changing road contours and is preferably further provided with means for particular orientation for turns or merging traffic situations.

The intensity of the transmitted signal is correlated with the speed of the vehicle through circuitry associated with the speedometer mechanism either as a means to vary the resistance on the transmitting circuit in ratio to the needle deflection of the speedometer or by use of the speedometer mechanism as a source for the generation of an electromotive force.

Thus, a vehicle within the reception zone will receive a warning that it is in a hazard zone as between itself and another moving or stationary vehicle and that the distance between them should accordingly be adjusted.

In its preferred embodiment, the apparatus of the present invention further includes a hazard warning device integrated within the system for selected actuation during desired situations, generally when the transmitting vehicle is at rest or during lane changes or merging traffic.

6 Claims, 10 Drawing Figures

INVENTOR.
DAVID SPIVAK
BY Auslander
& Thomas
ATTORNEYS

APPARATUS FOR DETERMINING THE PROXIMITY OF MOVING VEHICLES

The present invention relates to an apparatus for determining the proximity of moving objects and more particularly for such apparatus for vehicles.

Statistics indicate that death and/or serious injury is all too probable to those employing vehicular transportation. One of the major causes of traffic accidents is the inability of one vehicle to stop in time to avoid collision with another vehicle due to what is commonly referred to as "tail gating." While no doubt there are those who have a reckless disregard for maintaining a proper distance between their vehicles and the vehicles of others, by and large the driver of a vehicle oftentimes is unaware of the minimum safe distance requirements that should be maintained. The combination of the high speed capabilities of modern vehicles with the relatively quiet environment within a moving vehicle oftentimes gives a driver a false indication as to the actual distance needed to stop his vehicle.

Even more difficult to ascertain for the average driver is the speed of approach of a vehicle. Entrances to parkways are often backed up with vehicles since the driver or drivers in one or more of the cars on the entrance roadway is uncertain as to his ability to enter the main traffic lanes from his slow moving or stopped position. In a like manner vehicles in the main traffic lane adjacent the entrance roadway do not see, or observe too late the entrance of another vehicle from the entrance roadway to the main traffic lane.

While the concern respecting these problems has been marked, few if any tangible remedies have been suggested. In the past, it has been suggested that the problem of "tail gating" could possibly be somewhat alleviated by the provision of an ultrasonic warning system within a vehicle. The pulse-echo cycle of such a system was designed to actuate warning devices in the emitting vehicle and such as by the blinking of lights or the like on the warning vehicle to those to the rear of it. By and large such a system is relatively complex and has inherent limitations. Such a system generally provides a fixedly mounted transmission reception unit at the rear of the vehicle. Such a system may be somewhat accurate on straight roads, however, where curves or turns are encountered, the ultrasonic transmission does not follow the path of a following vehicle and as such a dangerous condition may be present although undetected. Furthermore such a system is limited solely to the problem of "tail gating".

According to the present invention there is provided an apparatus for the determination of the proximity of vehicles which not only provides data as to distances between moving vehicles on curved as well as straight roadways, but additionally serves as a warning device for merging vehicles and/or as between a moving vehicle and a vehicle at rest.

The present invention provides a constant transmission of a signal preferably from the rear of one vehicle to a receiving unit, preferably at the front on another vehicle. The signal transmitted preferably employs the ultrasonic doppler frequency of 10,000 to 30,000 c.p.s. due to the highly directional features of such a signal with the intensity of the signal directly correlated to the speed of the transmitting vehicle.

The transmission device itself is so mounted within the vehicle as to automatically orient the transmitter towards a following vehicle. The variable orientation of the transmitter further provides the means whereby the presence of another vehicle or vehicles during merging or during lane changes is readily ascertainable.

In its preferred embodiment the present invention provides means whereby a distressed vehicle can emit a hazard warning to approaching vehicles.

As hereinafter more particularly described the present invention generally comprises means on a vehicle to receive an ultrasonic signal and means to transmit an ultrasonic signal with the transmission means including means to vary the intensity of the transmitted signal in direct correlation to the speed of the transmitting vehicle and means to moveably mount the signal emission member of the signal transmission means whereby the signal emission member alters its orientation in relationship to the path of movement of the transmitting vehicle.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1A:
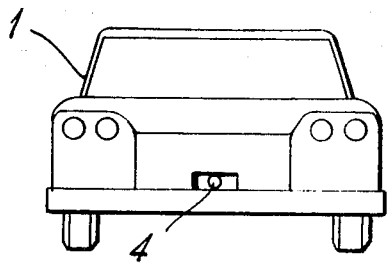
FIGS. 1a and 1b are front and rear views respectively of a vehicle including the apparatus of the present invention.
Figure 1B:
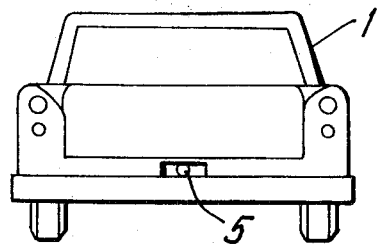

As illustrated in FIGS. 1a and 1b, the apparatus of the present invention is mounted to the front and rear of a vehicle 1 with the signal reception member 4 of the signal reception means 2 located along the front end of the vehicle 1 and the signal emission member 5 of the signal transmission means 3 located along the rear of the vehicle 1.

While the vehicle 1 has been illustrated in the form of an automobile it is readily appreciated that the apparatus of the present invention is suitable for use with other vehicles such as trucks, trains, water craft or the like.

Figure 2:
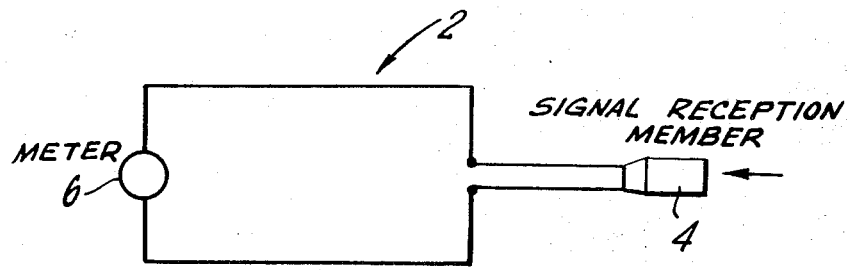
FIG. 2 is a schematic view of a signal receiving system of the present invention.

The signal reception member 4 as shown in FIG. 2 is preferably a transducer such as a piezo-electric crystal or the like which is adapted to receive and respond to an ultrasonic signal of varying intensity. In circuit with the reception member 4 is a meter 6 or any other indicator which is mounted in the vehicle within the line of sight of the vehicle operator, such as on the dashboard of a car. If desired, a buzzer or other audible indicator (not shown) could be made a part of the circuitry so as to produce an audible warning when the received signal reached a given intensity or amplitude. The audible signal should be a whining one, and tamperproof, and thus not easily ignored by a driver. In such case, it would be desirable that the audible signal only be heard when the following vehicle is actually in a danger zone.

Figure 3:
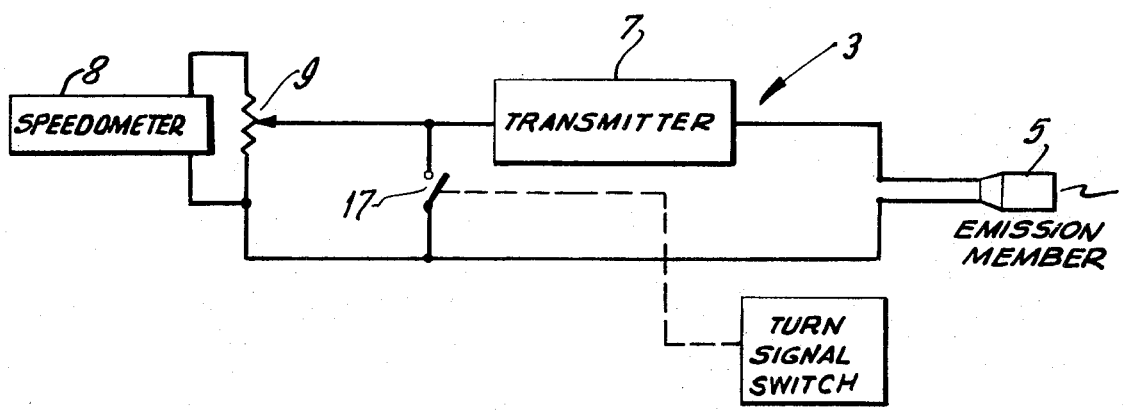
FIG. 3 is a schematic view of a signal transmitting system of the present invention.

The signal transmission means 3 illustrated in FIG. 3 generally provides, a transmitter 7 which includes a power source (not shown) such as the storage battery of the vehicle and means (not shown) to initiate the desired electric signal at a given intensity level such as amplifiers or the like. In circuit with the transmitter 7 is the emission member 5 such as a transducer.

Figure 4:
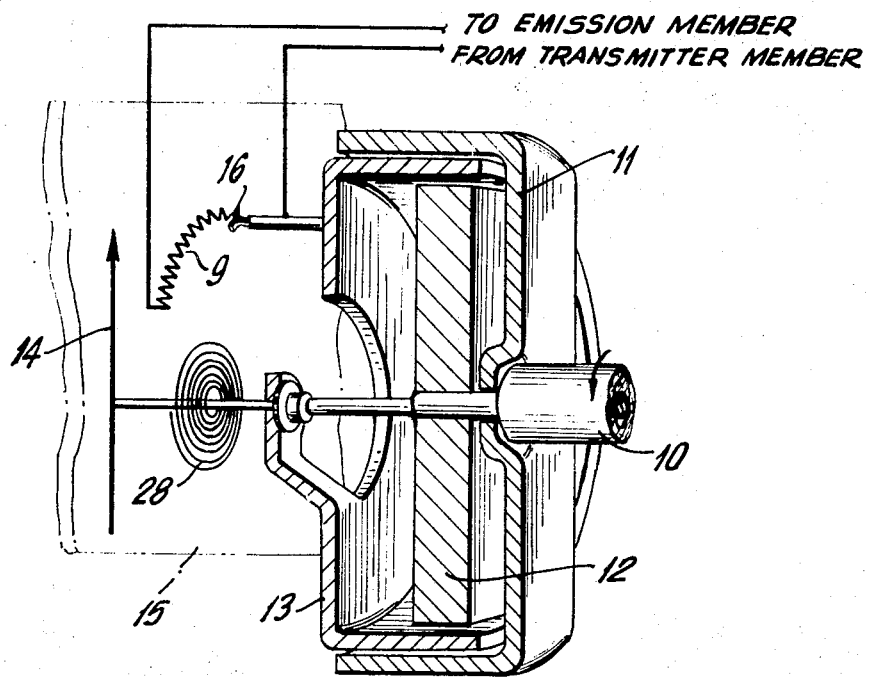
FIG. 4 is a perspective view, partially schematic and partly in section showing a signal transmitting arrangement of the present invention.

So as to vary the amplitude of the signal with the speed of the vehicle the circuit between the transmitter 7 and the emission member 5 includes signal varying means such as the speedometer 8, potentiometer arrangement most clearly illustrated in FIG. 4.

The speedometer 8 is, except as hereinafter modified substantially similar to those known in the art and includes a speedometer cable 10 adapted to rotation either by connection (not shown) to the wheels or transmission of a vehicle; a field plate 11; a permanent magnet 12 affixed to the speedometer cable 10 and adapted to rotate; a speed cup 13 mounted so as to react to the magnetic field set up by the rotating magnet 12; and an indicator needle 14 operably linked to the speed cup 13 for correlated movement in relationship to the movement of the speed cup 13. The indicator needle 14 is generally spring biased by spring 28 to a given position, generally the zero indication on the indicia markings normally found on the plate 15 of the speedometer 8. As the cable 10 rotates so does the magnet 12 and the speed of rotation of the magnet 12 determines the degree of deflection of the speed cup 13 which in turn determines the position of the indicator needle 14 relative to the indicia (not shown) on the face of the plate 15.

As shown in FIG. 4 the potentiometer 9 is mounted to the rear of the plate 15 and is aligned along the plate 15 so as to provide a varying degree of resistance in direct correlation to the degree of deflection of the speed cup 13. A moveable contact 16 in circuit with the transmitter 7 is affixed to the speed cup 13 and as the speed cup 13 deflects the point of contact as between the moveable contact 16 and the potentiometer 9 is altered.

The circuit to the signal emission member 5 is completed through the potentiometer 9. Thus, the resistance is variable and correlatively the signal intensity is variable depending upon the speed of the transmitting vehicle.

The slower the speed of the transmitting vehicle, the greater the resistance and the lesser the intensity of the signal. Thus, a tail gating warning as between two moving vehicles is effected with the correlation of speed to signal intensity with a given intensity of signal as emitted by the emission member 5 effecting a desired response in the signal reception means 2 in the following vehicle.

A following vehicle is thus made aware of the speed of the vehicle in front of it and will be warned to maintain the desired safe distance between vehicles.

If desired the problems of spacing attendant upon a situation wherein a following vehicle is rapidly closing upon a slower moving vehicle can be readily provided for by providing in addition to the signal reception means 2 illustrated in FIG. 2 circuitry which will also cause a warning reading on the meter 6 due to the rapid increase of the transmitted signal.

In addition to the correlated speed intensity signal transmitted a hazard warning signal can be emitted. As shown in FIG. 3 the circuit through the potentiometer 9 can be bypassed by the closing of the switch 17. So, for example a vehicle at rest can, by the closing of the switch 17 warn another vehicle as to its presence through the emission of a high intensity signal. The switch 17 can be in circuit with any desired actuating means, such as the toggle switch or the like (not shown) which actuates the hazard warning lights now required on all new automobiles; or, as shown in FIG. 3 the switch may be closed upon actuation of the turn signals of a vehicle.

Figure 5:
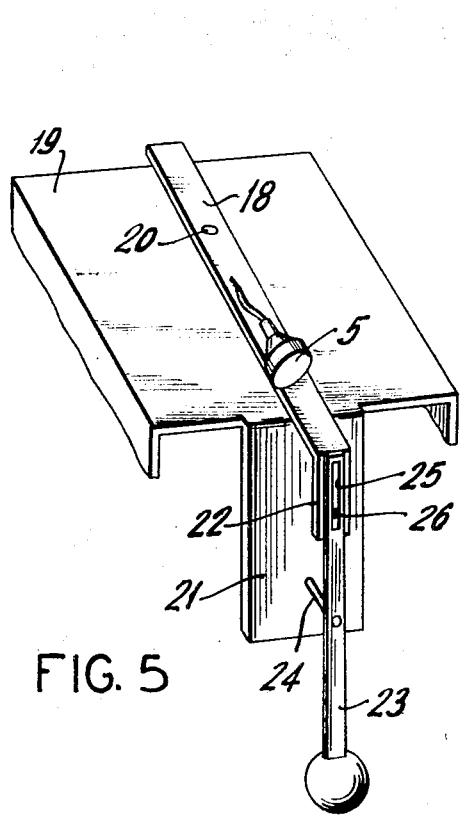
FIGS. 5 and 6 are elevational views of an emission member mounting of the present invention.
Figure 6:
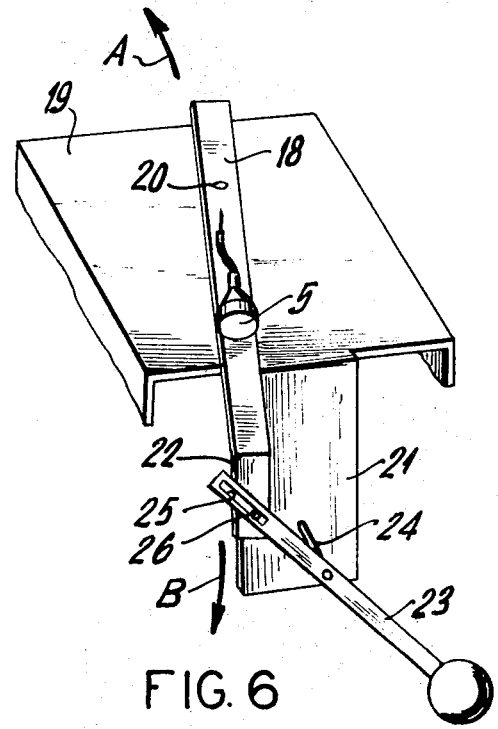

FIGS. 5 and 6 illustrate the moveable mounting of the signal emission member 5 of the present invention. So as to allow for the proper reception of the signal by a following vehicle, the signal transmitted from the rear of the transmitting vehicle should be mounted in a manner to orient the emission member 5 towards the following vehicle. A fixed mounting is generally unsuitable especially in motor vehicles where road curvature is constantly encountered and an axial alignment of vehicles in the same traffic lane is not always maintained.

The emission member 5 is fixed secured to an elongated member 18 horizontally disposed and pivotally mounted to a support base 19 such as through a vertical pivot post 20. The support base 19 is preferably a raised platform having a vertical surface 21 at least along one side thereof. One end of the elongated member 18 includes a vertically depending lip portion 22 which extends from the elongated member 18 from a point spaced apart from the surface of the support base.

A pendulum 23 is pivotally affixed to the vertical surface 21 and is preferably spaced apart from the vertical surface by the pivotal member 24. The pendulum 23 is further slidably engaged with the lip 22 on the elongated member 18 such as by providing a slot 25 along a section of the vertical arm of the pendulum 23 and by positioning a rivet 26 or the like through the slot with the flange on the head of the rivet 26 juxtaposed to the outer surface of the pendulum 23 and anchoring the rivet 26 to the lip 22.

As the transmitting vehicle turns, such as in going around a curve the pendulum 23 will be inertially maintained in its rest position and as shown in FIG. 6, where the direction of the vehicle is indicated by the arrow A, the emission member 5 is oriented to emit its signal, indicated by the arrow B towards the circumference of the turn.

The orientation will thus be effected upon any change in orientation of the vehicle. On entrances to main roadways where the entranceway is oftentimes an angulated roadway angling in towards the main traffic lanes the orientation caused by the directional shifting of the vehicle will position the emission member 5 to emit a signal which is receivable not only by a following vehicle on the entranceway, but also by the vehicles on the main traffic lanes of the road.

Figure 7:
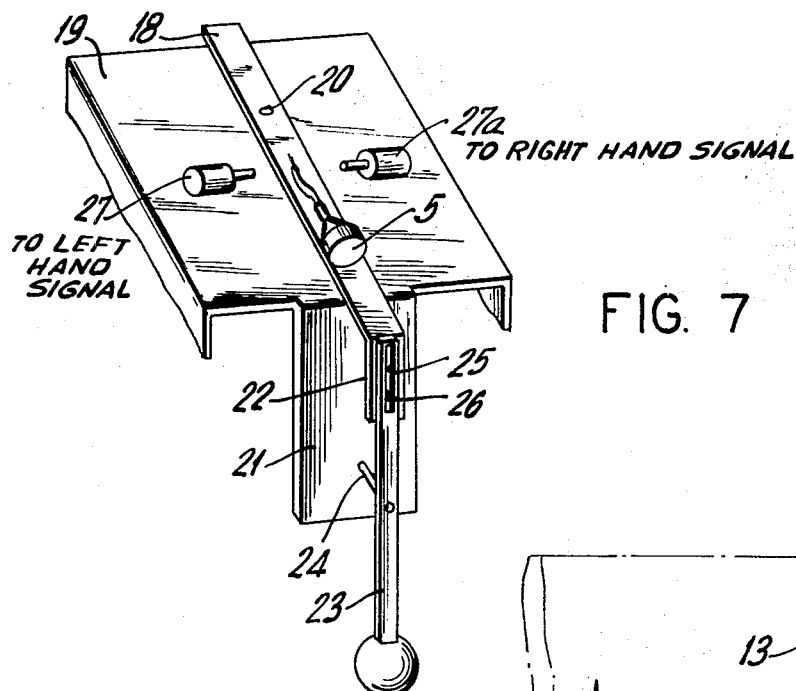
FIG. 7 is an elevational view of an alternate embodiment of the emission member mounting of FIGS. 5 and 6.

If desired, as illustrated in FIG. 7 means may be provided for the mechanical actuation of the lever or elongated member 18 so that the elongated member 18 is pivotal in response to the pendulum 23 and further actuatable for specified purposes by other means such as the solenoids 27,27a positioned on the support surface 19 along both sides of the elongated member 18. The solenoids 27,27a are shown actuatable by the turn signal mechanisms on the vehicle. If the right hand turn signal is actuated the solenoid 27a will engage the side of the elongated member 18 to orient the emission member 5 to emit its signals towards the right and to the rear of the vehicle. If the left hand turn signal is actuated, the solenoid 27 will engage the side of the elongated member to orient the emission member 5 to emit its signals towards the left and to the rear of the vehicle.

Since, as shown in FIG. 3 the hazard switch 17 which bypasses the potentiometer 9 may be actuatable by the turn signal mechanism an intense signal will be emitted as a warning to other vehicles even though turns and/or entrances to and from parkways are usually negotiated at relatively low speeds or from an initial standing position.

Figure 8:
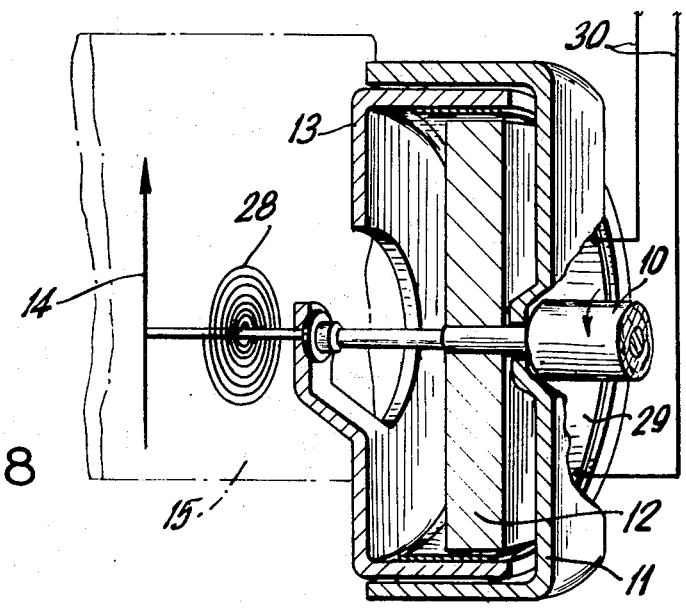
FIG. 8 is a perspective view partly in section and partly schematic of a signal transmitting arrangement of the present invention.
Figure 9:
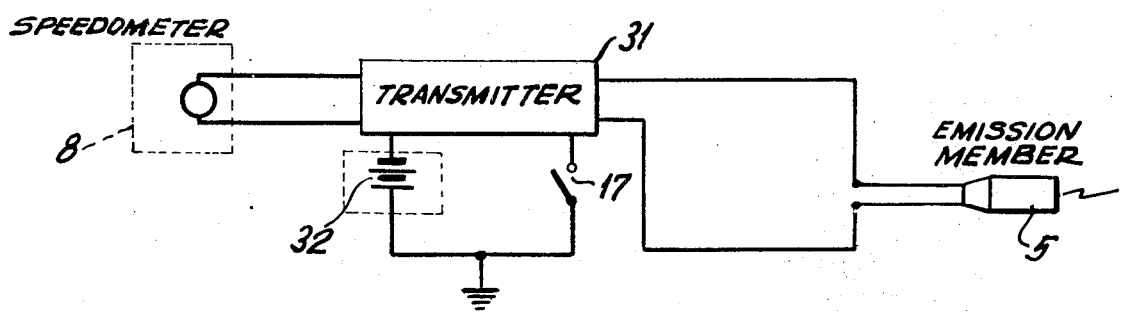
FIG. 9 is a schematic view of the system of FIG. 8 integrated with the system of the present invention.

While as illustrated in FIGS. 3 and 4 the intensity of the signal can be regulated by providing means in association with the speedometer intermediate the transmitter 7 and the emission member 5, as illustrated in FIGS. 8 and 9 the speedometer can be modified so as to act as the initiating generator for the signal.

As shown in FIG. 8 a conductive strip 29 is emplaced within the speed cup 13 with leads 30 from the conductive strip 29 to a transmitter 31 (shown in FIG. 9). The permanent magnet 12 rotates within the speed cup 13 in the manner heretofore described with the field plate 11 rotating in registry with the magnet 12. The magnetic flux generated passes at right angles to the conductive strip 29 inducing a current directly proportionate to the magnitude of the flux.

This in turn is the direct function of the speed of rotation of the speedometer cable thus the current directed to the transmitter 31 to energize the same is in direct ratio to the speed of the vehicle.

The hazard signal circuitry is integratable with the foregoing as illustrated in FIG. 9. Upon the closing of the switch 17 the hazard signal circuit through the transmitter 31 will be closed, with the power source illustrated as the auto battery 32 although a supplemental power source could readily be employed.

The terms and expressions which are employed are used as terms of description; it is recognized, though that various modifications are possible.

Having thus described certain forms of the invention in some detail, what is claimed is:

1. Apparatus for determining the proximity of moving vehicles comprising ultrasonic reception means on a vehicle to receive a transmitted signal, said signal reception means mounted at a point along the front end section of said vehicle said reception means including means adapted to a variable response dependent upon the intensity of the received signal, means on said vehicle to transmit an ultrasonic signal, said transmitting means including means to emit an ultrasonic signal, said signal emission means moveably mounted at a point along the rear end section of said vehicle said signal emission means including a support base, a horizontal member pivotally mounted to said support base; a vertical portion on said horizontal member at a point on said horizontal member extending beyond the periphery of said support base; a pendulum pivotally affixed to said support base at a right angle to said horizontal member, said pendulum slidably engaged to the vertical portion of said horizontal member, said signal emission means fixedly mounted to said horizontal member, means to vary the intensity of said ultrasonic signal in proportion to the speed of said transmitting vehicle, and said pendulum on said pivot moveable to tend to maintain said signal emission means oriented in relation to the path of movement of said vehicle.

2. The invention as claimed in claim 1 wherein said varying intensity means includes a moveable contact and variable resistance means in circuit with and intermediate of said signal generation means and said signal emission member whereby said contact is adapted to close a circuit with said variable resistance means with varying degrees of resistance dependent upon the speed of said vehicle.

3. The invention as claimed in claim 2 wherein said signal transmission means includes a speedometer having a field plate, rotatable magnet and a speed cup and said moveable contact is affixed to the speed cup of said speedometer and said variable resistance means includes a potentiometer disposed along the rear of the face plate of said speedometer in predetermined registry with selected areas of said face plate.

4. The invention as claimed in claim 1 wherein said signal transmission means includes a speedometer having a field plate, rotatable magnet and a speed cup and conductive means interposed at right angles to the magnetic flux created by said rotatable magnet.

5. The invention as claimed in claim 1 further including supplemental means adapted to selectively pivot said horizontal member.

6. The invention as claimed in claim 5 wherein said supplemental means include solenoids disposed along at least one side of said horizontal member.

* * * * *